No. 793,139. PATENTED JUNE 27, 1905.
J. I. MAGUIRE.
WHEEL.
APPLICATION FILED MAR. 7, 1905.

Witnesses:
Wilhelm Vogt
Thomas M. Smith

Inventor:
John I. Maguire
By Walter Douglass
Attorney

No. 793,139. Patented June 27, 1905.

UNITED STATES PATENT OFFICE.

JOHN I. MAGUIRE, OF WAYNE, PENNSYLVANIA.

WHEEL.

SPECIFICATION forming part of Letters Patent No. 793,139, dated June 27, 1905.

Application filed March 7, 1905. Serial No. 248,867.

*To all whom it may concern:*

Be it known that I, JOHN I. MAGUIRE, a citizen of the United States, residing at Wayne, in the county of Delaware and State of Pennsylvania, have invented certain new and useful Improvements in Wheels, of which the following is a specification.

My invention has relation to improvements in wheels for vehicles; and in such connection it relates to the general construction and arrangement of such wheels.

Hitherto wheels have been designed solid to be driven either by an axle or other means when the wheels were mounted loosely on the axle or shaft. Such wheels when employed on automobiles as rear or driving wheels required the employment of special mechanism to permit the wheels driven with equal speed to turn with unequal speed in passing around corners or in the movement of the vehicles in curves to overcome so-called "skidding" or turning of one of the wheels, which in such movements describe or move in a smaller curve. Furthermore, in instances where the motor of such a vehicle becomes unmanageable and incapable of being stopped the wheels positively driven by the motor could not be prevented from rotation by the application of a brake without destruction of the same. Neither could the wheels in the case of an accident be suddenly stopped by the brake without causing overturning of the vehicle.

The principal objects of my invention are therefore to overcome the above-mentioned disadvantages and to provide a wheel formed of disconnected sections concentrically arranged with respect to each other, which under normal conditions will permit the driving of such wheel by engaging and positively turning one of its sections, while under abnormal conditions permitting the free turning of one section within the other.

The nature and characteristic features of my invention will be more fully understood from the following description, taken in connection with the accompanying drawings, forming part hereof, in which—

Figure 1:
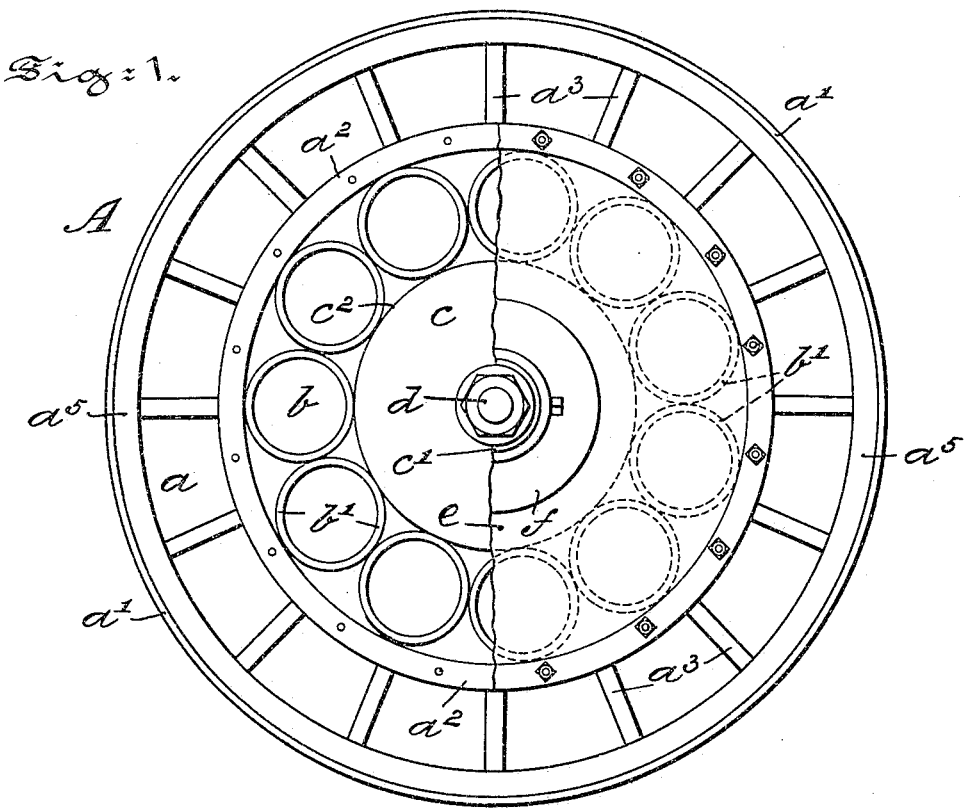
Figure 2:
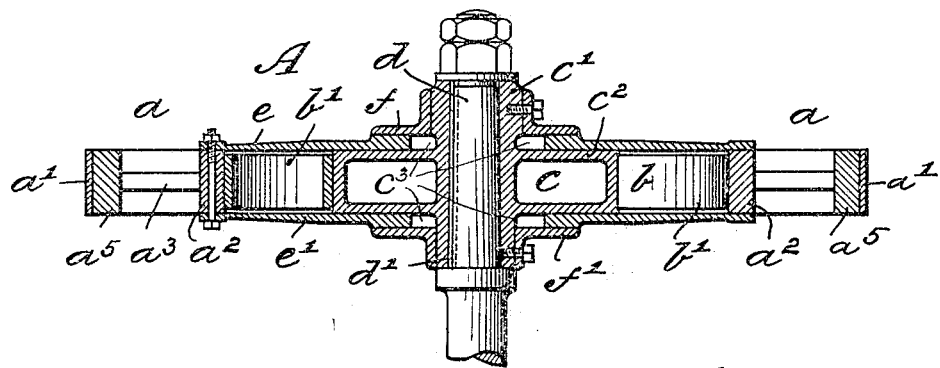

Figure 1 is a side elevational view of a wheel embodying main features of my invention, having a certain portion thereof broken away; and Fig. 2 is a cross-sectional view thereof.

Referring to the drawings, A represents a wheel consisting of three concentric sections $a$, $b$, and $c$. The intermediate section $b$ in the present instance is formed of steel rings $b'$, so as to afford a yielding support for the inner section $c$. The steel rings $b'$ bear with their outer peripheries against each other and against the outer perimeter of the inner or hub section $c$ and the inner perimeter of the outer or tire section $a$ with sufficient friction to connect the sections with each other and to permit the rotation of the wheel so formed under normal conditions when the hub portion $c$ is positively driven—for instance, by an axle $d$ of a vehicle, (not shown,) to which the wheel is secured by means of a key $d'$. If, however, the wheels A, driven with uniform speed by an axle $d$, move in circles of different radii the inner section $c$ of the wheel moving in the smaller circle is permitted to slide within the intermediate section $b$, thus compensating for the differences in distances both wheels have to travel in a given time. The sliding of the inner section $c$ is accomplished by the undue friction between the tire $a'$ of the outer section and the road-bed over which the same is dragged in such instances. This arrangement of the wheel A overcomes the necessity of dividing the axle $d$ into two sections and connecting the same with each other by a differential gearing. On the other hand, when the outer section $a$ of the wheel A is engaged by a brake to stop the rotation of the wheel in case of an accident or in case the motor of an automobile cannot be stopped by the ordinary means employed the inner or hub section $c$, positively driven by the axle $d$, will overcome the friction exerted by the steel rings $b'$, which under ordinary circumstances couple the sections with each other and will in this instance permit the turning of the hub-section $c$ within the sections $b$ and without causing any damage to the same.

The outer section $a$ may be provided, as shown, with a solid felly $a^5$, supporting a ring $a^2$ by means of spokes $a^3$.

The inner section $c$ is preferably formed of a solid casting having a hub $c'$ and an annular extension $c^2$.

In order to hold the steel rings $b'$ in position between the sections $a$ and $c$, plates $e$ and $e'$ are employed, which are bolted to the ring $a^2$ and freely slide in annular recesses or grooves $c^3$, formed between the extension $c$ and disks $f$ and $f'$, which are bolted to the hub $c'$, as shown in Fig. 2. This arrangement permits a yielding of the steel rings $b'$ with respect to the outer and inner sections $a$ and $c$.

Having thus described the nature and objects of my invention, what I claim as new, and desire to secure by Letters Patent, is—

1. A wheel, consisting of a tire-section and a hub-section, yielding rings interposed between said sections and adapted to frictionally and slidably connect the same with each other, means secured to said hub-section adapted to form in conjunction with the same recesses on each side of said hub-section and means connected with said tire-section adapted to engage said recesses and to be afforded a certain range of movement therein.

2. A wheel, consisting of an unyielding tire-section and an unyielding hub-section, yielding rings interposed between said sections and adapted to frictionally and slidably connect the same with each other, disks secured to said hub-section adapted to form in conjunction with the same, recesses on each side of said hub-section and plates secured to said tire-section adapted to engage said recesses so as to form a movable unyielding connection between the tire and hub sections.

3. A wheel, consisting of an unyielding tire-section having an internal ring, a hub-section having a circular extension and removable disks forming recesses on each side of said extension, yielding rings arranged between the ring of said tire-section and the circular extension of the hub-section and adapted to loosely and frictionally connect said sections with each other, and disks secured to the ring of said tire-section adapted to engage said recesses to form a movable unyielding connection between the tire and hub sections and to be afforded a certain range of movement therein.

In testimony whereof I have hereunto set my signature in the presence of two subscribing witnesses.

JOHN I. MAGUIRE.

Witnesses:
J. WALTER DOUGLASS,
THOMAS M. SMITH.